(No Model.)
V. F. STETZER.
SPRING PISTON PACKING RING.
No. 331,458. Patented Dec. 1, 1885.
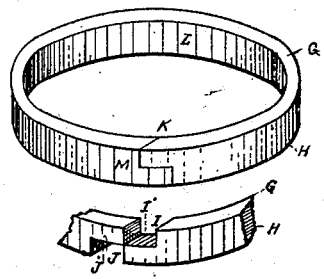
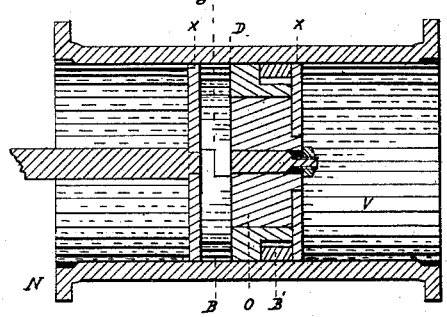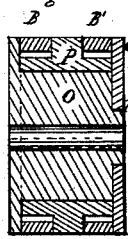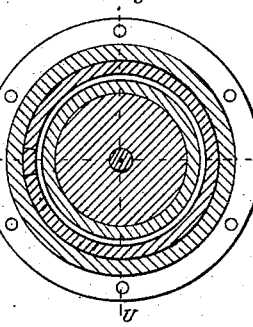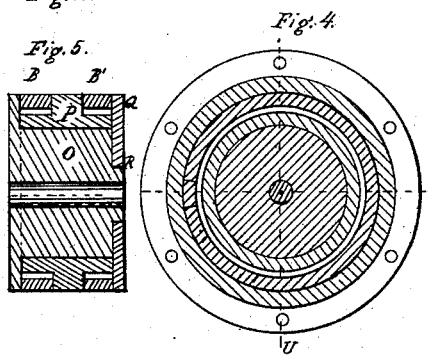
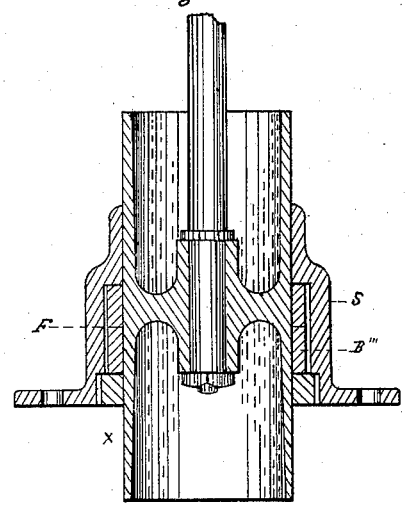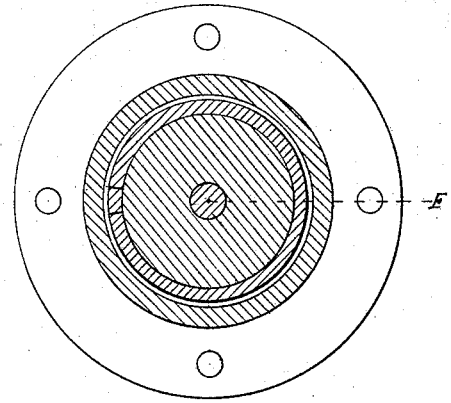
Witnesses.
J. H. Colburn
S. W. Goodwin
Inventor.
V. F. Stetzer
By J. H. Colburn,
Attorney.

UNITED STATES PATENT OFFICE.

VALENTINE F. STETZER, OF TOLEDO, OHIO.

SPRING PISTON-PACKING RING.

SPECIFICATION forming part of Letters Patent No. 331,458, dated December 1, 1885.

Application filed August 11, 1885. Serial No. 174,155. (No model.)

*To all whom it may concern:*

Be it known that I, VALENTINE F. STETZER, a citizen of the United States, residing at Toledo, in the county of Lucas and State of Ohio, have invented certain new and useful Improvements in Spring Piston - Packing Rings, of which the following is a description.

My invention relates to improvements in spring piston-packing rings for use in such places as steam and pump cylinders, each ring being generally and preferably made entirely from one piece of material, generally of cast-iron or of brass, and forming its own expanding or contracting spring, as the case may require, and at its point of severance forming a liquid, gas, or fluid tight joint or lap, and being made in such a way and by such a process as that the said ring shall present to the surface of the cylinder against which it presses a perfectly circular form of bearing.

In the manufacture of spring-rings of various kinds by the old processes it is a well-known fact that they are finished in a circular form, which in diameter is slightly larger than the diameter of the bore of the cylinder in which they are to be used, and after being so finished are cut open, generally diagonally, but in a few instances radially, and in cases of the diagonal cut have no tight joint at the opening of the ring, and in cases of the radial cut a joint is often formed by the insertion of a tongue between the cut surfaces in a well-known manner. Rings thus constructed slightly larger in diameter than the diameter of the cylinder in which they are to be used are sprung into the said cylinder by compression, which distorts the circular form of the ring, making it imperfectly fit the said cylinder. To obviate this effect and to produce a ring having the qualities before stated, which is, first, the production of a ring which, when sprung into the said cylinder, shall make a true concentric and as nearly a perfect fit as the present arts of construction will permit, and, secondly, to make a true and perfectly-tight joint at the opening or point of severance of the ring, are the primary objects of attainment in these improvements. I attain these objects by the mechanism illustrated in the accompanying drawings, in which—

Figure 1 is a perspective view of my spring piston-packing ring, showing the cuts on the open side closed. Fig. 2 is a perspective view of a section of the said ring, showing the said cuts on the open side as the ring appears when expanded to its fullest extent. Fig. 3 is a longitudinal section (on line A, Fig. 4) of a steam-cylinder and its piston-head, the latter having my improved spring piston - packing rings, one of which, B, is shown in section, and one of which, B', has shown its exterior or circular surface, the latter for the purpose of more clearly showing the cut and lap on its open side. Fig. 4 is a cross-section of Fig. 3 on line D. Fig. 5 is an entire sectional view on line U, Fig. 4, of the piston-head and its rings B and B'. Fig. 6 is a vertical section of a packing-cap and a plunger to a pump on line E, Fig. 7, embodying an application of my piston-packing ring, the piston-rod having its exterior surface shown instead of being in section. Fig. 7 is a cross-section on line F, Fig. 6.

Similar letters refer to similar parts throughout the several views.

In Fig. 1 is very clearly shown the construction of my piston-packing ring. This ring is preferably made of hard cast-iron or of hard brass, but may be made of any suitable material, which may be cast, rolled, or by any analogous process prepared in a circular form of the proper proportions for the completion of a finished ring. The surfaces G H are first made perfectly true, smooth, and parallel, which constitutes the final finishing of these surfaces, being of the proper breadth to fit into its place in the piston-head in which it is to be used. Two radial cuts, I J, (shown in Fig. 2, one on each side of the ring and each extending, preferably, about one-half way through, and to the extent of meeting each other, for the purpose of severing the ring, and the formation of the lap shown at K in Fig. 1,) are next made. The overlapping surfaces I' and J' having thus been formed, they are then ground or scraped, or in any suitable way made to truly fit together, still maintaining the parallelism of the sides G H. The ring is then sprung together, as shown at K in Fig. 1, thus forming an inherent spring of the same metal and making a close joint, (which is at all times maintained until the ends of the ring are so far separated by wear as to uncover the lap, which never occurs in use.) While held in this closed position the ring is truly bored on its inner surface, L, and turned or trued on its outer surface, M, the latter to the exact size of the cylinder-bore V in which it is to be used.

It is obvious, that when this ring is sprung together and truly turned on its outer diameter to fit the bore of the cylinder in which it is to be used, the outer surface or periphery of the ring will be concentric with the bore of the cylinder and a perfect fit from the start, and being such a fit at the commencement of its course these relations will be maintained by the future wear of the parts.

In Figs. 3, 4, 5, 6, and 7 are shown applications of this ring.

In Figs. 3, 4, and 5 are shown a steam-cylinder and a piston-head, in which N is the cylinder, and O P Q the piston-head, in three parts, supporting the rings B and B'. In this application the rings B and B' expand outwardly against the inner surface, V, of the cylinder N.

In Figs. 6 and 7 is shown an application of my piston-packing ring to a pump, wherein the ring B''' contracts inwardly instead of expanding outwardly, the principle and operation being identical, the operation of constructing the ring only being slightly different, and is as follows: After the operation of constructing the ring, as hereinbefore described, has been carried to the extent of finishing the surfaces of the lap I' J' the ring is expanded (with a hammer or other suitable instrument) upon its outer surface, M, which causes the ring to be closed, as shown in Fig. 1. The operation of completing the ring is then continued substantially as hereinbefore described, the inside of the said ring being bored the exact size of the outside of the plunger X. (Shown in Fig. 6.)

I am aware that prior to my invention various kinds of elastic piston-rings have been invented and used, all of which, when made of one piece of metal and forming their own spring, have been cut open to produce the elastic effect after the surface which contacts with the cylinder in which it is to be used has been completed, and have generally been cut diagonally and used with the open ends separated from each other; but in cases where a lap or close joint has been formed in such rings it has been formed by the insertion of one or more additional pieces of metal, and, as hereinbefore described, these and other analogous methods of construction produce distorted and imperfect rings. I therefore do not claim such combinations, broadly; but What I do claim as my invention, and desire to secure by Letters Patent, is—

A spring piston-packing ring made of one piece of material and having the notched lap K and a true circular periphery corresponding to the circular periphery of the inner surface of the cylinder in which it is to be used, and forming of itself an inherent adjusting-spring, substantially as herein shown and described.

V. F. STETZER.

Witnesses:
L. H. COLBURN,
L. W. GOODWIN.